July 28, 1959 R. A. COLBY ET AL 2,897,299

INFORMATION STORAGE DRUM

Filed July 22, 1957 2 Sheets-Sheet 1

INVENTORS
HARRY M. PASSMAN
ROBERT A. COLBY
BY
Moody & Habicht
ATTORNEYS

INVENTOR.
HARRY M. PASSMAN
ROBERT A. COLBY
BY
Mody & Harbeck
ATTORNEYS

United States Patent Office 2,897,299

Patented July 28, 1959

2,897,299

INFORMATION STORAGE DRUM

Robert A. Colby, Marion, and Harry M. Passman, Cedar Rapids, Iowa, assignors to Collins Radio Company, Cedar Rapids, Iowa, a corporation of Iowa Application July 22, 1957, Serial No. 673,269

1 Claim. (Cl. 200—6)

This invention relates to automatic positioning systems and more particularly to information storage systems adapted to provide predetermined positioning information.

In prior memory storage systems large cumbersome storage drums have been utilized using movable buttons in slots providing for a presetting of a plurality of channels of binary information, These prior art storage drums have been unduly large for the information stored and have been limited in their scope in the number of bits of information possible. A typical application of the prior art and other memory storage systems has been by relating the numerous positions of the storage drums to channels in communication systems such as shaft positions in automatic shaft positioners.

None of the prior art systems have been particularly adaptable to modifications permitting frequency presentation instead of channel presentation in control of communications equipment. The prior art systems permit a channel selection to a number such as thirty or forty but fail to give a spectrum-wide range such as is possible under this invention.

It is an object of this invention to provide storage of information of binary nature for control of automatic positioning systems.

It is a further object of this invention to provide an information storage drum for automatic shaft positioning systems wherein said drum provides at least hundreds of channels of information permitting indication in communication equipment of frequency settings by kilocycle or other desired frequency spacing.

It is a further object of this invention to provide a compact information storage drum yielding high storage capacity.

It is a further object of this invention to provide information storage of binary nature.

It is a feature of this invention that a plurality of cam sets are positioned adjacent a switch assembly, each cam set providing a full decade of information, the plurality providing a gross set of decade information with additional pluralities of cam sets for other additional full decades of information.

It is a further feature of this invention that frequency selection for communication sets may be set in directly without the use of translating code tables.

Further objects, features, and advantages of this invention will become apparent from the following description and claim when read in conjunction with the accompanying drawings in which:

Figure 1:
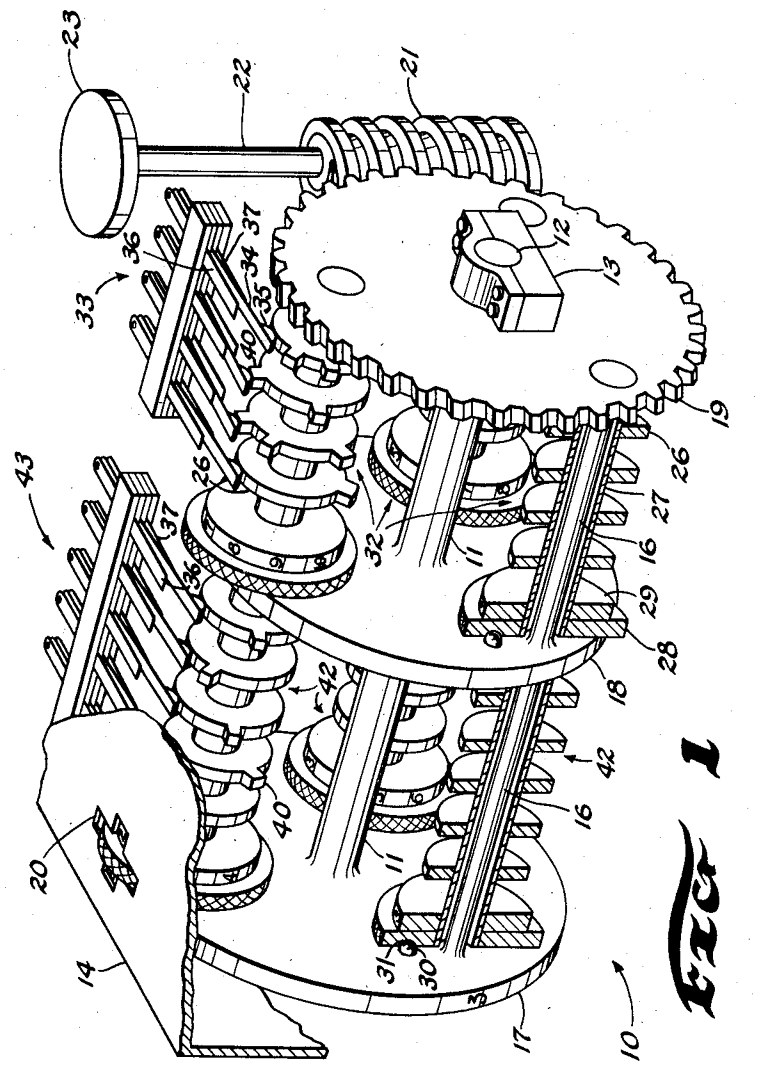
Figure 1 shows a partially sectioned isometric view of the storage drum.

In Figure 1 information storage drum 10 is mounted on a central axle 11 which in turn is mounted by its ends 12 in bearings 13. The storage drum 10 is mounted behind and adjacent a panel 14. The bearings 13 are mounted on the panel 14 or on the chassis behind the panel in some convenient manner.

The drum has a plurality of cam support axles 16 mounted between drum heads 17, 18, and 19. This assembly of central axle 11, cam support axles 16, and drum head plates 17, 18, and 19 is rigid. The first drum head 17 in this form of the invention is made slightly larger so as to provide a tangential junction with the panel 14. Indicia such as the numeral 3, readily seen, and the numeral 2 visible through the port 20, indicate the particular gross channel selected by the rotational position of the entire drum. In application to communication systems covering the range in the hundreds of megacycles, this first set of indicia would indicate two hundred or three hundred megacycles.

The center drum head 18 is made no bigger than necessary for support of the cam support axles. The end drum head 19 has gear teeth milled on its periphery thereof for engagement with a worm 21. Where desired, the gear may be on or mounted by some other drum head plate when convenience or other exigency requires, Worm 21 is mounted on shaft 22 which is supported by unillustrated bearings. These bearings are mounted on front panel 14 or on the chassis in a manner similar to the mounting of bearings 13. A knob 23 mounted on shaft 22 projects above the front side of panel 14 for operator control of the gross channel indicated by head plate 17.

Between each pair of drum head plates are arranged a plurality of cam sets, one on each cam support axle. These cam sets are each in the form of lobed cams 26 mounted on a hollow cylinder 27. Also mounted on each of the cam support tubes 27 is a knurled finger wheel 28 and an indicia wheel 29. The indicia wheel 29 has such a radius that when in position adjacent front panel 14, the circumference becomes tangential to the front panel so that indicia thereon may be visible through the port 20 or such other apertures as may be provided for further pluralities of cam sets. The knurled finger wheel 28 is yet enough larger than the indicator wheel 29 that the rim of the finger wheel projects through the port 20 sufficiently for digital rotation of the cam set. This is readily seen at the port 20.

A strong detent is used to retain each cam set in the digitally selected position. These detents consist of a ball 30 for each cam set urged by a spring, not seen, into dimples 31 in the side of the finger wheel 28. The dimples 31 are provided relative to the cam lobe positions, as are the indicia, such that each position is securely detented against undesired motion such as may be induced by the followers upon rotation of the entire drum for adjustment of the gross channel.

A complete cam set 32 is shown after having actuated a switch assembly 33. The switch assembly 33 is composed of a plurality of switch arms 34 having follower surfaces 35 at their tips. The follower surfaces 35 are positioned at a point on the circumference of the storage drum so as to engage the cam set positioned by the gross adjustment of the drum and indicated by indicia on head plate 17.

The switch arms are moved by the cam sets between two positions, up contacting one set of fixed contacts 36, and down contacting a second set of fixed contacts 37. Cams 26, having no lobe at the point of contact scanned by follower surface 35, permit the switch arm 34 to contact the lower contact 37. Lobes 40 in position on the cam sets to engage the follower surfaces 35 force the switch arm up into contact with the upper fixed contact 36. Thus the presence of a lobe 40 at a lobe position determines which circuit is selected by the switch arm 34, of the pair of fixed contacts 36 and 37. This determination is made for each section of the switch assembly 33.

Rotation of the cam set by its finger wheel 28 runs the switch assembly through a predetermined sequence of permuted combinations as set by manufacture of the cam sets with desired lobe arrays.

A further plurality of cam sets 42 adjacent cam set 32 in the drum, using five cams, engages switch assembly 43. Switch assembly 43 correspondingly has five switch arms and cam followers. It is to be understood that the number of cams and cooperating switch circuits for each sensing station is made consistent with the shaft positioning system utilized. In the example of the communication system given above, for the system extending over hundreds of megacycles and utilizing the indicia on head plate 17 for the hundreds may well then use the information in cam sets 42 for the tens of megacycles as selected by their indicia wheels 29 visible through port 20. The cam sets 32 may then be used for units of megacycles with the unit megacycles selected indicated through a port in the removed part of front panel 14, showing the numbers on the indicia wheels 29 associated with those cam sets. It is, of course, within the spirit of the invention to provide further sensing stations to give additional decades in the frequency presentation either in kilocycles or in megacycles, as well as to provide more cam sets than the three shown on the drum in this example of the invention.

Figure 2:
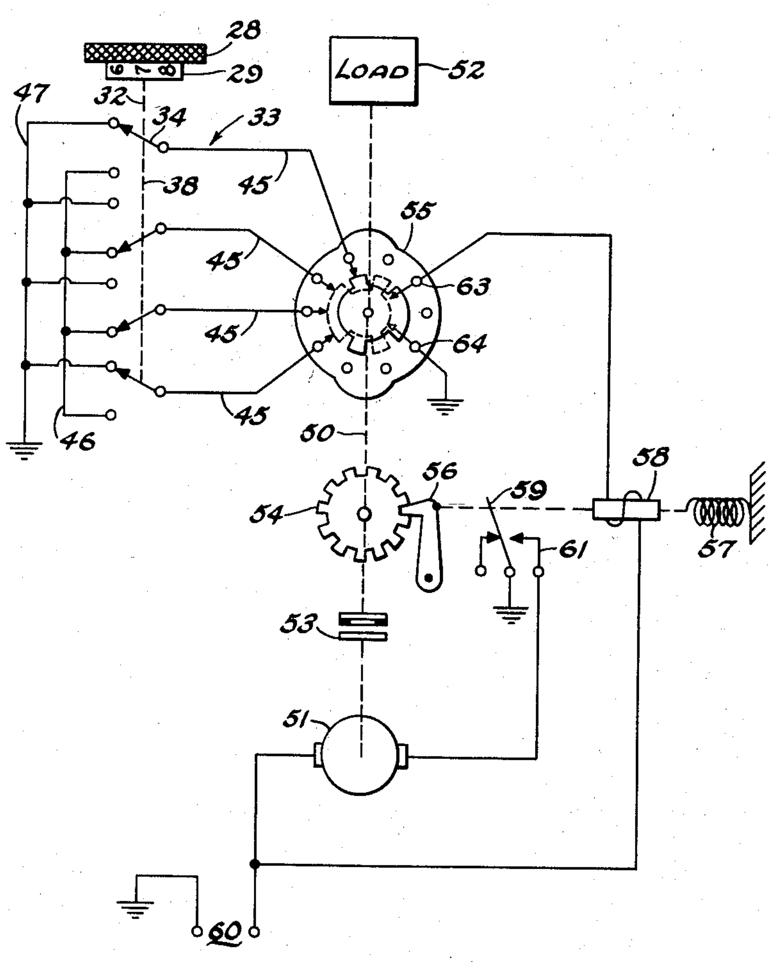
Figure 2 shows a schematic circuit diagram utilizing one plurality of cam sets of the storage drum of Figure 1.

A typical circuit for application of the information storage drum of Figure 1 is shown in Figure 2. Here the switch assembly 33 is seen by its circuit diagram. As in Figure 1, the first and fourth switch arms 34 are in one position while the second and third switch arms are in the other position. The cam set 32 is indicated by a dashed line acting on the switch arms 34.

A typical automatic shaft positioning system is shown in Figure 2. The patent to May et al., 2,476,673, issued July 19, 1949, is another typical automatic positioning system which can utilize the data read-out from the information storage drum of Figure 1.

The positioning system of Figure 2 is, succinctly, a seeking switch system. The switch assembly 33 connects each of the plurality of lines 45 to either of two busses, 46, which is ungrounded, or 47, which is grounded. The cam set 32 actuates switch assembly 33 in such order of permutations as is needed to describe the angular position of the controlled shaft. The shaft to be positioned is shaft 50 extending from a motor 51 to a load 52. Intervening the motor and the load is a torque limiting clutch 53 which permits the motor to overrun after the shaft is positioned. Mounted on shaft 50 on the load side of the clutch is a stop wheel 54 and a seeking switch 55.

Stop wheel 54 cooperates with a pawl 56 to position shaft 50 and the load at the desired angular position. A solenoid 58 lifts pawl 56 out of engagement with stop wheel 54 and at the same time moves switch arm 59 into contact with fixed contact 61 to complete the ground circuit of motor 51. Release of solenoid 58 permits spring 57 to drive pawl 56 against the stop wheel.

The other side of motor 51 is connected to the ungrounded terminal of the power supply available at terminal 60. Similarly, solenoid 58 is connected between the ungrounded side of terminal 60 and the ground established by the switching circuit at switch 55.

The circuit of Figure 2 operates by switch assembly 33 establishing a sequence of grounded and ungrounded interconnected lines. Seeking switch 55 connects these various lines to the wiper contacts 63 and 64 in a series of different permuted combinations as a consequence of the particular shape of the two rotor conductors of the switch. Wiper 63 contacts the solid line rotor, and wiper 64, in skeleton, contacts the dashed line rotor. If some circuit occurs between wiper 63 and either the grounded bus 47 or the grounded wiper 64, the circuit through solenoid 58 is closed and the solenoid is actuated.

Pawl 56 is lifted out of engagement with stop wheel 54, and arm 59 makes contacts with fixed contact 61 to energize motor 51. The motor 51 then rotates shaft 50 until the seeking switch 55 establishes a sequence of switch connections between the lines 45 and the wiper contacts 63 and 64 which are consonant with the switching sequence of switch assembly 33. At this point, all circuits will be opened or ungrounded, opening the ground circuit of solenoid 58. When this occurs, at a unique position in the rotation of shaft 50, solenoid 58 releases, pawl 56 drops into the corresponding notch in stop wheel 54, and the motor circuit is opened.

The torque limiting clutch 53 prevents the sudden stop of the controlled system from damaging the motor. Load 52 is now positioned in concurrence with the information supplied to the automatic shaft positioning system by the read-out of the information stored in the particular cam set 32. A more complete description of the operation of Figure 2 will be found in the May et al. patent noted above.

The five section switch assembly 43 has an associated seeking switch system similar to that illustrated in Figure 2 for the switch assembly 33.

The operation of the storage drum in Figure 1 is relatively simple. The cam sets contain information in each lobe position, in binary code, by lobes or absence thereof as to the desired shaft position for that cam set position. Knob 23 is rotated until the desired rotational position of drum 10 is achieved, as seen by the indicia on head plate 17, visible through port 20. This sets the gross channel, or in the example given above, the hundreds of megacycles. The remaining data for the ultimate, total shaft positioning involved is then set in by turning finger wheels 28 digitally for each of the cam sets in and adjacent the port 20. Thus, as may be seen in the illustration, the drum is turned to the second position such as for two hundred megacycles, cam set 43 is turned such as to the second ordinal, for twenty megacycles, and the cam set 33 is set to the seventh ordinal, for seven megacycles, the information drum for this example then being set to two hundred and twenty-seven megacycles.

The lobing of the cam sets is predetermined by any appropriate procedure consonant with the shafts to be positioned. On the event that separate oscillators or switching systems are controlled by the equipment, the switch assemblies 33 and 43 are connected to the different positioning systems. The lobes 40 are present or absent in accord with the dictates of the switching system such as exemplified in Figure 2, the information being stored by the drum being a presence or absence of lobes.

Now assuming that the system is positioned to two hundred and twenty-seven megacycles, were the operator to move the finger wheel 28 of the cam set 32 to the next detented position such as 8 to establish a position of two hundred and twenty-eight megacycles, it is apparent that the lobing would then actuate every other switch across switch assembly 33. This would then establish a new set of grounded and ungrounded lines 45 of Figure 2, providing a ground circuit for solenoid 58 to actuate and run the system through its cycle.

Although this invention has been described with respect to particular embodiments thereof, it is not to be so limited because changes and modifications may be made therein which are within the full intended scope of the invention as defined by the appended claim.

We claim:

In a shaft positioning system of the type having a plurality of control conductors for binary control, each control conductor having two electrical conditions, and said electrical conditions being applied to said control conductors in different permutations corresponding to the different digits of the decade numbering system; an information storage device for retaining a plurality of sets of digital information in binary permutation and for applying individually any selected one of said permutations to said conductors comprising, a switch assembly having a plurality of two-position switches, each switch having a follower arm with first and second positions corresponding to the two electrical conditions respectively to be applied by the respective switch to a corresponding one of said control conductors, a plurality of cam sets, each cam set having a rotary cam for each of said switch followers, an indicia wheel and an axle, said indicia wheel and said rotary cams being spaced apart and coaxially mounted on said axle, a drum having a pair of drum head plates, said drum being rotatably mounted on its longitudinal axis, the axles of said cam sets being spaced apart and rotatably mounted between said drum heads, said axles being parallel to said axis and equal distances therefrom, said switch assembly being disposed relative to said drum for positioning said followers on a line parallel to the axis of said drum, said followers engaging the peripheries of corresponding cams of a selected cam set, each of said cam sets having different detented positions corresponding to different digits, means for rotating said cam sets on their respective axles to different ones of said detent positions for operating said switches in different permutations of said first and second electrical conditions, and means for rotating said drum to different indexed positions for engaging said followers with different ones of said cam sets, whereby said switches are operated in different permutations determined by the digital positions of successively selected cam sets.

References Cited in the file of this patent

UNITED STATES PATENTS

| | | |
|---|---|---|
| 1,468,275 | Briggs | Sept. 18, 1923 |
| 2,163,864 | Bissel | June 27, 1939 |
| 2,782,287 | Smith | Feb. 19, 1957 |

FOREIGN PATENTS

| | | |
|---|---|---|
| 304,880 | Great Britain | Jan. 31, 1929 |